United States Patent [19]
Roach et al.

[11] 4,440,404
[45] Apr. 3, 1984

[54] PACKING ARRANGEMENT

[75] Inventors: James D. Roach, Henderson, Colo.; Clinton W. Cole, Duncan, Okla.

[73] Assignee: Halliburton Company, Duncan, Okla.

[21] Appl. No.: 406,546

[22] Filed: Aug. 9, 1982

[51] Int. Cl.³ .............................................. F16K 43/00
[52] U.S. Cl. ....................................... 277/124; 277/59
[58] Field of Search .......................... 277/124, 125, 59

[56] References Cited

U.S. PATENT DOCUMENTS

| | | |
|---|---|---|
| 1,381,931 | 6/1921 | Ostrander . |
| 2,063,839 | 12/1936 | Crooks et al. . |
| 2,274,688 | 3/1942 | Griepenstroh . |
| 2,427,789 | 9/1947 | Kehle . |
| 2,456,623 | 12/1948 | Cooper . |
| 2,494,598 | 1/1950 | Waring . |
| 2,658,809 | 11/1953 | Schultz . |
| 2,684,274 | 7/1954 | Saxon . |
| 2,757,994 | 8/1956 | Snyder . |
| 2,844,392 | 7/1958 | Stonich et al. . |
| 2,844,421 | 7/1958 | Hyman . |
| 2,907,614 | 10/1959 | Rosen . |
| 3,069,178 | 12/1962 | Rosen . |
| 3,169,776 | 2/1965 | Felt . |
| 3,284,089 | 11/1966 | Wrenshall . |
| 3,312,150 | 4/1967 | Strader . |
| 3,327,681 | 6/1967 | Hortvet . |
| 3,519,280 | 7/1970 | Genz . |
| 3,554,563 | 1/1971 | Schumacher et al. . |
| 3,907,307 | 9/1975 | Maurer et al. . |
| 4,082,300 | 4/1978 | Harbeck et al. . |
| 4,106,551 | 7/1978 | Nixon et al. . |
| 4,116,451 | 9/1978 | Nixon et al. . |
| 4,300,776 | 11/1981 | Taubenmann ....................... 277/124 |
| 4,352,499 | 10/1982 | Foster ................................... 277/59 |

OTHER PUBLICATIONS

Exhibit No. 1, a Photocopy of a Cross-Sectional Drawing of a Prior Art Packing used by the Assignee of the Present Invention having Three V-Shaped Packing Elements Located Between a Brass Male Adapter and a Brass Female Adapter.

Exhibit No. 2, Apparatus Shown in Haliburton Drawing No. 333.99521.
Exhibit No. 3, Garlock Drawing No. HC77A106, Sheets 1 and 2 of 2.
Exhibit No. 4, Copy of Page entitled "Garlock Chevron Packings for Extreme Pressure" from Catalog HC-300, WP-REV5/80-15m by Garlock, Inc., of Colt Industries.
Exhibit No. 5, Catalog Sheet entitled "Standard Inch Hallite 07" Showing a Commercially Available Header Ring Utilized with Fabric-Type V-Shaped Rings and Female Adapters.
Exhibit No. 6, p. 3873 entitled "Expendable Pump Parts-USS Fluid King", Showing a Piston Seal Utilizing Homogeneous Rubber Lip with a Fabric Reinforced Heel and a Built-In Wear Ring.
Exhibit No. 7, Universal Packing and Gasket Company Drawing No. A-2271 Showing a Bronze Spacer Used Between Packing Rings for Reinforcement.
Exhibit No. 8, Universal Packing and Gasket Company Drawing No. A-3031 Showing a Metal Spacer Used Behind Packing Sets Next to a Female Adapter.
Exhibit No. 9, Universal Packing and Gasket Company Drawing No. A-2589 and A-2694 Showing Packing Assemblies Utilizing Rigid Spacers Behind Packing Sets Next to a Female Adapter.
Exhibit No. 10, Cover Sheet and p. 28 from Publication TR-79-89, TerraTek Report on Phase III-Part 2, Contract No. 07-7298, Showing a Back-Up System Including Felxing Back-Up Rings in a Packing Assembly.
Exhibit No. 11, Universal Packing and Gasket Company Drawing No. A-2976 Showing a Packet Set.
Exhibit No. 12, Universal Packing and Gasket Company Drawing No. A-2627 Showing a Packing Set.
Exhibit No. 13, Universal Packing and Gasket Company Drawing No. A-2823 Showing a Spacer Ring.

Primary Examiner—Robert I. Smith
Attorney, Agent, or Firm—Lucian Wayne Beavers; Joseph A. Walkowski; Thomas R. Weaver

[57] ABSTRACT

A packing assembly provides a seal for an annular space between a pump plunger and a pump body of a reciprocating plunger pump. The pumping assembly includes an elastomeric header ring disposed in a high pressure end of the annular space for preventing migration of fluid through the annular space due to radial compression of the header ring. At least one V-shaped packing ring is disposed in the annular space behind the header ring and has a concave side thereof facing the header ring. A female adapter ring is disposed in the annular space behind a last V-shaped packer ring. A V-shaped anti-extrusion ring is disposed in the annular space between the last V-shaped packing ring and the female adapter for preventing extrusion of the last V-shaped packing ring between the female adapter and each of the pump plunger and the pump body.

23 Claims, 3 Drawing Figures

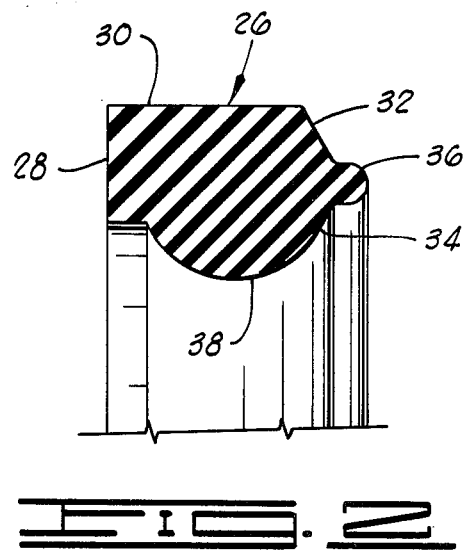
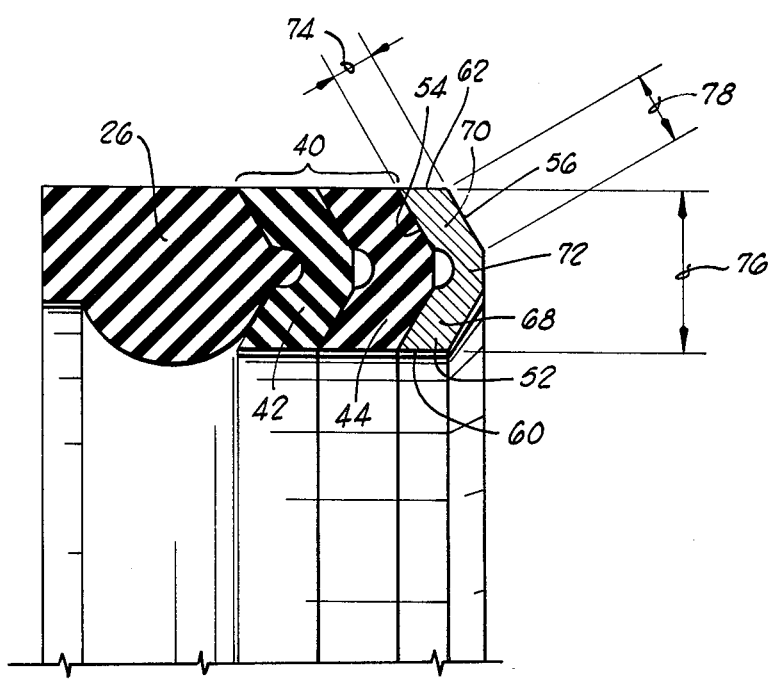

PACKING ARRANGEMENT

The present invention relates generally to packings for use in an annular packing space between a first cylindrical member which reciprocates within a cylindrical bore of a second member, and more particularly, but not by way of limitation, to such packing sets specifically designed for use in sealing the high pressure ends of a reciprocating plunger pump utilized for pumping cement slurries, fracturing slurries, acids and the like for the completion and stimulation of wells in the oil and gas industry.

During the completion and/or stimulation of an oil or gas well, fluids such as cement slurries, fracturing slurries, acids and the like are pumped under pressure into the well. Very high pressures on the order of many thousands of pounds per square inch are typically involved in these pumping operations. Additionally, the fluids are often very abrasive because they carry large quantities of solid particles therein.

This pumping operation is typically achieved by large positive displacement reciprocating plunger-type pumps.

A very difficult sealing problem is encountered at the high pressure end of these pumps, where the abrasive fluid must be prevented from leaking between the reciprocating plunger and the cylinder within which it reciprocates.

Typically, the seal between the reciprocating plunger and the cylinder comprises a packing arrangement including a plurality of V-shaped packing rings constructed of cloth and binder, with various male and female adapters at the forward and rearward ends of those packing sets. A longitudinal compression is applied to the packing set by an adjusting ring.

Problems encountered in the use of such packing include the deterioration of the V-shaped cloth and binder packing rings due to the hydraulic load from the high pressure fluid end of the pump. A second problem typically encountered is extrusion of the V-shaped cloth and binder packing rings between the small annular clearances present between a female adapter supporting the rearward end of the packing rings and the pump plunger and pump cylinder.

The prior art has included the use of header rings for providing a primary seal between the plunger and cylinder.

The prior art has also included various anti-extrusion devices for preventing extrusion of the packing rings when subjected to high pressures.

The present invention provides a particularly effective combination of a header ring, a packing ring means, and a V-shaped anti-extrusion ring means.

The particular combination of the present invention has been found to provide operating lifetimes of the packing sets substantially in excess of the lifetimes experienced with typical prior art packings.

The packing assembly of the present invention provides a means for sealing an annular space between a pump plunger and a pump body of a reciprocating plunger pump. The assembly includes a radially compressed elastomeric header ring means disposed in a high pressure end of the annular space for preventing migration of fluid through the annular space.

A packing ring means is disposed in the annular space behind the header ring means, and includes at least one V-shaped packing ring with a concave side thereof facing the header ring means. A female adapter ring is disposed in the annular space behind a last V-shaped packing ring of the packing ring means. A V-shaped anti-extrusion ring means is disposed in the annular space between the last V-shaped packing ring and the female adapter. The anti-extrusion ring means provides a means for preventing extrusion of the last V-shaped packing ring between the female adapter and each of the pump plunger and the pump body. The anti-extrusion ring means includes a concave side engaging the last V-shaped packing ring and a convex side engaging a forward concave side of the female adapter. The anti-extrusion ring means further includes radially inner and outer sealing surfaces for engaging the pump plunger and the pump body, respectively.

Numerous objects, features and advantages of the present invention will be readily apparent to those skilled in the art upon a reading of the following disclosure when taken in conjunction with the accompanying drawings.

FIG. 2 is a cross-section view of the header ring of the packing assembly of FIG. 1.

FIG. 3 is a cross-section view of the header ring, the packing ring means, and the anti-extrusion ring of FIG. 1, all affixed together in a packing set prior to placement thereof in the annular space of the reciprocating plunger pump.

Figure 1:
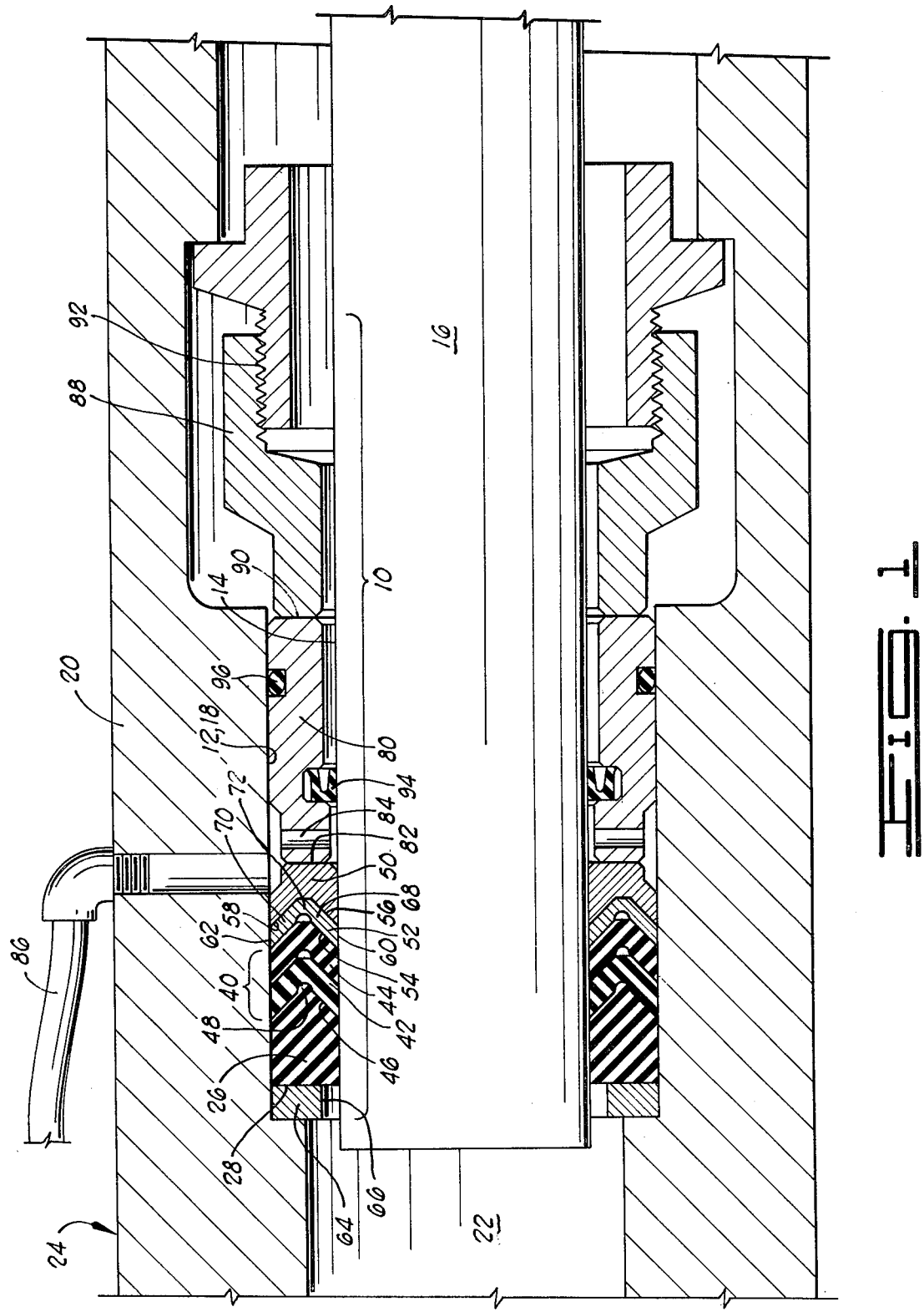
FIG. 1 is a schematic sectioned elevation view of a reciprocating plunger pump having the packing assembly of the present invention in place therein.

Referring now to the drawings and particularly to FIG. 1, the packing assembly of the present invention is shown and generally designated by the numeral 10. The packing assembly 10 is shown in place within an annular space 12 defined between a radially outer surface 14 of a pump plunger 16 and a cylindrical bore 18 of a pump body 20.

The plunger 16 reciprocates within the pump body 20 to pump a fluid located in a high pressure end 22 of the pump 24 through a series of inlet and outlet valves (not shown) in a manner which is generally known to those skilled in the art. The pump 24 can be any reciprocating plunger pump and particularly may be a reciprocating plunger pump for pumping cement slurries, fracturing slurries, acids and the like for completion and stimulation of an oil or gas well.

The packing assembly 10 includes an elastomeric header ring means 26. The header ring means 26 is disposed in a high pressure end of the annular space 12 which is the end adjacent the high pressure end 22 of pump 24.

Header ring means 26 provides a primary seal of annular space 12 due to radial compression of header ring means 26. This primary seal provides a means for preventing migration of fluid from the high pressure end 22 of pump 24 through the annular space 12.

Prior to placement in the annular space 12, the header ring means 26 has an uncompressed cross-sectional shape as shown in FIGS. 2 and 3.

Header ring means 26 includes a forward facing flat annular surface 28, and a radially outer cylindrical surface 30. A rearward end of header ring means 26 is rearwardly tapered as at 32 and 34 and includes a bead 36 on the rearward end thereof. A radially inner surface 38 of header ring means 26 is partially circular in cross-section and is constructed to be engaged by the pump plunger 16 upon assembly of the pump 24 so that the cross-section of header ring means 26 is radially compressed within the annular space 12 between the pump plunger 16 and the pump body 20.

The header ring means 26 is solid in cross-section, i.e., there are no voids in the cross-section to be closed up upon radial compression, but rather the radial compression occurs across a solid portion of the header ring means 26.

The header ring means 26 is preferably constructed of a homogeneous elastomeric material. By the term "homogeneous" it is meant that the elastomeric material from which the header ring 38 is constructed does not include any nonhomogeneous materials, such as layers of cloth or other reinforcing type materials therein. Non-homogeneous elastomeric materials could, however, be used for the header ring means 26. Also, a reinforcing fabric (not shown) may be used on the rearward surfaces 32, 34, 36 of header ring means 26.

Preferably, the header ring means 26 is constructed from nitril butadiene rubber having a hardness of seventy to eighty durometer.

The packing assembly 10 further includes a packing ring means 40 disposed in the annular space 10 behind the header ring means 26.

Packing ring means 40 is shown as including first and second V-shaped packing rings 42 and 44. Packing ring means 40 must include at least one V-shaped packing ring, and may include more than two such rings.

The first V-shaped packing ring 42 has a concave side 46 adjacent, facing and engaging the rearward end 32, 34 of header ring means 26. The bead 36 of header ring means 26 is closely received within a D-shaped groove 48 in the concave side 46 of packing ring 42, to anchor the packing ring 42 to the header ring means 26.

The packing rings 42 and 44 are conventional cloth and binder type packing rings.

A female adapter ring 50, preferably constructed from brass, is disposed in the annular space 12 behind the last V-shaped packing ring 44 of packing ring means 40.

A V-shaped anti-extrusion ring means 52 is disposed in annular space 12 between the last V-shaped packing ring 44 and the female adapter 50.

Anti-extrusion ring means 52 provides a means for preventing extrusion of the last V-shaped packing ring 44 between the female adapter 50 and each of the pump plunger 16 and the cylindrical bore 18 of pump body 20.

The anti-extrusion ring means 52 includes a concave side 54 facing, adjacent and engaging a rear side of the last V-shaped packing ring 44.

Anti-extrusion ring means 52 also includes a convex rear side 56 facing, adjacent and engaging a forward concave side 58 of female adapter 50.

Anti-extrusion ring means 52 also includes radially inner and outer sealing surfaces 60 and 62 engaging pump plunger 16 and cylindrical bore 18 of pump body 20, respectively.

The V-shaped anti-extrusion ring means 52 is so arranged and constructed that it is sufficiently flexible that the inner and outer sealing surfaces 60 and 62 thereof are spread apart into sealing engagement with the pump plunger 16 and the cylindrical bore 18 of pump body 20, respectively, when fluid pressure in the high pressure end 22 of pump 24 reaches a first value less than a fluid pressure required to extrude the last V-shaped packing ring 44 between the female adapter 50 and either of said pump plunger 16 or cylindrical bore 18 of pump body 20.

Such extrusion problems have typically been encountered with prior art type packings at pressures on the order of about 6,000 psi in the high pressure end 22. Thus, the first value of pressure in the high pressure end 22 at which the anti-extrusion ring means 52 should flex to seal the clearances between female adapter ring 50 and the pump plunger 16 and pump body 20 should be at a value significantly lower than 6,000 psi.

As is best illustrated in FIG. 3, in a preferred embodiment of the invention, the header ring means 26, packing ring means 40 including the packing rings 42 and 44, and the anti-extrusion ring means 52 are all affixed together into a preassembled packing set prior to installation thereof in the annular space 12.

This affixation of header ring 26, packing rings 42 and 44, and anti-extrusion ring 52 can be achieved by means of gluing the components together.

The packing assembly 10 further includes a brass header ring adapter means 64, disposed in the annular space 12 ahead of and engaging the forward surface 28 of elastomeric header ring means 26. Header ring adapter means 64 could also be constructed of other metal or plastic materials.

The header ring adapter means 64 provides a means for longitudinally supporting the elastomeric header ring means 26 against forward extension thereof when pump plunger 16 reciprocates forward relative to pump body 20.

The header ring adapter means 64 has a substantially rectangular cross-section, as can be seen in FIG. 1, with a radially inner surface 66 thereof spaced from pump plunger 16 to allow high pressure fluid from high pressure end 22 to contact the front side 28 of elastomeric header ring means 26.

The V-shaped anti-extrusion ring means 52 is V-shaped in cross-section as seen in FIGS. 1 and 3.

This cross-section is defined by a radially inner leg 68 and a radially outer leg 70. The legs 68 and 70 are joined together at their rearward ends as at 72. Each of the legs 68 and 70 has a thickness 74 as seen in cross-section substantially smaller than a cross-sectional length 78 of the leg.

The concave side 54 of anti-extrusion ring means 52 is defined by forward surfaces of the radially inner and outer legs 68 and 70.

The convex side 56 of anti-extrusion ring means 52 is defined by rearward surfaces of the radially inner and outer legs 68 and 70.

The radially inner sealing surface 60 of anti-extrusion ring means 52 is defined on a forward end of the radially inner leg 68.

The radially outer sealing surface 62 of anti-extrusion ring means 52 is defined on a forward end of the radially outer leg 70.

Preferably, the anti-extrusion ring means 52 is a bronze stamping which is stamped from a sheet of bronze. After stamping, the anti-extrusion ring means 52 should be fully annealed.

A thickness 74 of radially outer leg 70, as best illustrated in FIG. 3, preferably has a value in the range of about 0.080 to 0.100 inches. The included angle between the legs 68 and 70 is preferably approximately 90°.

A radial width 76, again best seen in FIG. 3, of anti-extrusion ring means 52 is typically on the order of about one-half inch for a pump plunger 16 having a diameter of about 4.5 inches.

Thus, a length 78 of radially outer leg 70 for this disclosed embodiment is approximately 0.35 inches which is substantially greater than the thickness 74 thereof.

The V-shaped anti-extrusion ring means 52, and particularly the embodiment just disclosed, is so constructed that a permanent set is imparted thereto when the inner and outer sealing surfaces 60 and 62 are spread apart due to the forces from high pressures in high pressure end 22 of pump 24.

The packing assembly 10 further includes a seal carrier means 80 disposed in the annular space 12 directly behind and engaging a rear end 82 of female adapter ring 50.

The seal carrier means 80 has an oil passage 84 disposed therethrough for conducting lubricating oil from a lubricating oil supply line 86 to the pump plunger 16 for lubricating the pump plunger 16 along the area of sealing engagement with the packing assembly 10.

Seal carrier means 80 includes inner and outer seals 94 and 96 for sealing against plunger rod 16 and cylindrical bore 18 of pump body 20, respectively.

Packing assembly 10 further includes a packing adjustment ring means 88 located behind and directly engaging a rear end 90 of seal carrier means 80.

Packing adjustment ring means 88 may be adjusted by rotation of the same at threaded connection 92 for advancing packing adjustment ring means 88 relative to pump body 20 and for thereby adjusting a longitudinal compression of the remaining components of packing assembly 10.

In the packing assembly 10, a high sealability against leakage of fluid from high pressure end 22 is provided by the radial compression of header ring means 26. This is the primary seal against fluid leakage.

Additional sealing against migration of fluid from the high pressure fluid end 22 is provided by the packing rings 42 and 44.

Extrusion of the last packing ring 44 past the female adapter ring 50 is prevented by anti-extrusion ring means 52.

The V-shaped rings, such as 42 and 44 and such as the anti-extrusion ring means 52, achieve their sealing effect due to being pressure energized or mechanically energized to spread the legs of the V-shaped sealing elements so as to seal the ends of those legs against the pump plunger and the pump body. That is as contrasted to the radial compression which achieves the seal on the header ring means 26.

The wearing components of the packing assembly 10 include the header ring means 26, the packing elements 42 and 44, and the anti-extrusion ring means 52 which wears on the surfaces 60 and 62.

These wearing components may be replaced when they wear out by disassembling the packing assembly 10 and replacing the header ring means 26, the packing elements 42 and 44, and anti-extrusion ring means 52 with a new packing set such as that illustrated in FIG. 3.

The header ring adapter means 64 and the female adapter ring 50 may be reused and generally do not need to be replaced when the pump 24 is repacked.

This provides a significant improvement over certain prior art attempts to provide an anti-extrusion device wherein a component analogous to the female adapter 50 itself was designed to flex to prevent extrusion. In those prior art designs, the female adapter itself would wear and thus would need to be replaced when the pump was repacked.

With the packing set of the present invention having the anti-extrusion ring means 52 directly ahead of the female adapter 50, a replaceable wearing ring, namely the anti-extrusion ring means 52, is provided which may be easily and economically replaced upon repacking of the pump 24.

An additional advantage of the packing assembly 10 is that the resiliency of the solid cross-section elastomeric header ring means 26 substantially eliminates the need to periodically tighten the packing adjustment ring 88.

Experimental field test results have shown the life of the packing assembly of the present invention to be several times greater than the life of standard packing arrangements which use neither a header ring means such as 46 or an anti-extrusion ring means such as 52.

Thus, it is seen that the apparatus of the present invention readily achieves the ends and advantages mentioned as well as those inherent therein. While certain preferred embodiments of the present invention have been illustrated for the purposes of this disclosure, numerous changes in the arrangement and construction of parts may be made by those skilled in the art, which changes are encompassed within the scope and spirit of the present invention as defined by the appended claims.

What is claimed is:

1. A packing assembly for sealing an annular space between a pump plunger and a pump body of a reciprocating plunger pump, said assembly comprising:

a radially compressed elastomeric header ring means disposed in a high pressure end of said annular space, for preventing migration of fluid through said annular space;

packing ring means disposed in said annular space behind said header ring means, said packing ring means including at least one V-shaped packing ring with a concave side of said packing ring facing said header ring means;

a female adapter ring disposed in said annular space behind a last V-shaped packing ring of said packing ring means; and a V-shaped anti-extrusion ring means disposed in said annular space between said last V-shaped packing ring and said female adapter for preventing extrusion of said last V-shaped packing ring between said female adapter and each of said pump plunger and said pump body, said anti-extrusion ring means including:

a concave side engaging said last V-shaped packing ring;

a convex side engaging a forward concave side of said female adapter; and radially inner and outer sealing surfaces for engaging said pump plunger and said pump body, respectively.

2. The packing assembly of claim 1, wherein:

said V-shaped anti-extrusion ring means is so arranged and constructed that it is sufficiently flexible that said inner and outer sealing surfaces thereof are spread apart into sealing engagement with said pump plunger and said pump body, respectively, when fluid pressure in said high pressure end of said annular space reaches a first value less than a fluid pressure required to extrude said last V-shaped packing ring between said female adapter and either of said pump plunger and said pump body.

3. The packing assembly of claim 2, wherein:

said header ring means, said packing ring means, and said V-shaped anti-extrusion ring means are affixed together into a preassembled packing set prior to installation thereof in said annular space.

4. The packing assembly of claim 2, further comprising:
a header ring adapter means disposed in said annular space ahead of and engaging said elastomeric header ring means, for longitudinally supporting said elastomeric header ring means against forward extension thereof when said pump plunger reciprocates forward relative to said pump body.

5. The packing assembly of claim 4, wherein:
said header ring adapter means has a substantially rectangular cross-section with a radially inner surface thereof spaced from said pump plunger to allow high pressure fluid to contact a front side of said elastomeric header ring means.

6. The packing assembly of claim 5, wherein:
said elastomeric header ring means has a solid cross-section.

7. The packing assembly of claim 2, wherein:
said V-shaped anti-extrusion ring means is V-shaped in cross-section, said cross-section being defined by a radially inner leg and a radially outer leg, said legs being joined together at their rearward ends, each of said legs having a cross-sectional thickness substantially smaller than a cross-sectional length thereof;
said concave side of said V-shaped anti-extrusion ring means is defined by forward surfaces of said radially inner and outer legs;
said convex side of said V-shaped anti-extrusion ring means is defined by rearward surfaces of said radially inner and outer legs;
said radially inner sealing surface of said V-shaped anti-extrusion ring means is defined on a forward end of said radially inner leg; and
said radially outer sealing surface of said V-shaped anti-extrusion ring means is defined on a forward end of said radially outer leg.

8. The packing assembly of claim 7, wherein:
said V-shaped anti-extrusion ring means is a bronze stamping.

9. The packing assembly of claim 7, wherein:
said V-shaped anti-extrusion ring means is so constructed that a permanent set is imparted thereto when said inner and outer sealing surfaces are spread apart.

10. The packing assembly of claim 1, wherein:
said elastomeric header ring means is constructed from a homogeneous elastomeric material.

11. The packing assembly of claim 10, wherein:
said elastomeric header ring has a solid cross-section.

12. The packing assembly of claim 11, wherein:
said elastomeric header ring means is so arranged and constructed that it seals said annular space due primarily to radial compression of said elastomeric header ring means between said pump plunger and said pump body.

13. The packing assembly of claim 1, wherein:
said elastomeric header ring has a solid cross-section.

14. The packing assembly of claim 1, wherein:
said elastomeric header ring means is so arranged and constructed that it seals said annular space due primarily to radial compression of said elastomeric header ring means between said pump plunger and said pump body.

15. The packing assembly of claim 1, further comprising:
a seal carrier means, disposed in said annular space directly behind said female adapter ring, said seal carrier means having an oil passage disposed therethrough for conducting lubricating oil to said pump plunger.

16. The packing assembly of claim 15, further comprising:
a packing adjustment ring means, located behind and directly engaging said seal carrier means, for adjusting a longitudinal compression of said elastomeric header ring means, said packing ring means, and said V-shaped anti-extrusion ring means.

17. A preassembled annular packing set, comprising:
an elastomeric header ring means for providing a primary seal due to radial compression thereof;
a packing ring means including at least one V-shaped packing ring having a concave side thereof adjacent and affixed to said header ring means; and
a V-shaped anti-extrusion ring means, having a concave side thereof adjacent and affixed to a convex side of said packing ring means, for preventing extrusion of said packing ring means.

18. The packing set of claim 17, wherein:
said elastomeric header ring means has a solid cross-section.

19. The packing set of claim 18, wherein:
said elastomeric header ring means is constructed from a homogeneous elastomeric material.

20. The packing set of claim 17, wherein:
said elastomeric header ring means is constructed from a homogeneous elastomeric material.

21. The packing set of claim 17, wherein:
said V-shaped anti-extrusion ring means is V-shaped in cross-section, said cross-section being defined by a radially inner leg and a radially outer leg, said legs being joined together at rearward ends thereof away from said header ring means, each of said legs having a cross-sectional thickness substantially smaller than a cross-sectional length thereof;
said concave side of said V-shaped anti-extrusion ring means is defined by forward surfaces of said radially inner and outer legs;
a convex side of said V-shaped anti-extrusion ring means is defined by rearward surfaces of said radially inner and outer legs;
a radially inner sealing surface of said V-shaped anti-extrusion ring means is defined on a forward end of said radially inner leg; and
a radially outer sealing surface of said V-shaped anti-extrusion ring means is defined on a forward end of said radially outer leg.

22. The packing set of claim 21, wherein:
said V-shaped anti-extrusion ring means is a bronze stamping.

23. The packing set of claim 21, wherein:
said V-shaped anti-extrusion ring means is so constructed that a permanent set is imparted thereto when said inner and outer sealing surfaces are spread apart.

* * * * *